United States Patent [19]
Kojima et al.

[11] 3,946,854
[45] Mar. 30, 1976

[54] TRANSPORTING METHOD

[75] Inventors: Hiromitsu Kojima, Takehara; Kimio Yoshida, Osaka, both of Japan

[73] Assignees: Mitsui Mining & Smelting Co., Ltd., Tokyo; Fuji Sangyo Co., Ltd., Osaka, both of Japan

[22] Filed: Feb. 14, 1974

[21] Appl. No.: 442,598

[52] U.S. Cl. .................. 198/21; 198/34; 214/1 BB
[51] Int. Cl.² .................................... B65G 47/52
[58] Field of Search........... 214/7, 1 BB, 309, 8.5 R, 214/8.5 SS, 152; 198/21, 20 R, 37, 29, 34

[56] References Cited
UNITED STATES PATENTS

| | | | |
|---|---|---|---|
| 2,940,617 | 6/1960 | Reed | 198/21 X |
| 3,148,785 | 9/1964 | Fauconnier | 214/16.1 B X |
| 3,244,303 | 4/1966 | Conner | 214/1 BB X |
| 3,297,379 | 1/1967 | Artaud et al. | 312/223 |
| 3,799,322 | 3/1974 | VanLinder et al. | 214/8.5 SS X |
| 3,805,944 | 4/1974 | Yuryan | 198/21 X |

*Primary Examiner*—Frank E. Werner
*Attorney, Agent, or Firm*—Woodhams, Blanchard and Flynn

[57] ABSTRACT

A method of transporting objects wherein when the presence of one or more object is detected in a first stock apparatus, a transfer apparatus adapted to transport objects picks up one of the objects from said first stock apparatus and transports it towards a second stock apparatus, and only when the presence of a space for mounting such objects in said second stock apparatus is detected, said transfer apparatus transfers said object onto said second stock apparatus.

5 Claims, 9 Drawing Figures

TRANSPORTING METHOD

BACKGROUND OF THE INVENTION

The present invention relates to a method and apparatus for transporting such objects as electrodes, namely what are referred to as anodes and cathodes, which are mounted on stock apparatuses.

Up to now, for example, in a metallic salt electrolysis operation, in order to facilitate the operation of those mechanical devices which are provided to load and unload electrodes into and from the electrolysis bath, stock conveyors have been utilized which are designed to arrange and stock a suitable number of electrodes in the neighborhood of said mechanical devices. However, in order to perform the operations smoothly, a substantial number of electrodes has to be stocked on hand, requiring huge stock conveyors. Such huge stock conveyors carrying many electrodes are disadvantageous not only because the great loads require strong conveyor construction and driving power, but also because of the hugeness, their operating expense becomes great.

Accordingly, an object of the present invention is to eliminate these disadvantages of conventional designs by arranging several stock conveyors in such a manner that they are linked by an automatically travelling transfer apparatus provided among them, so that with a very simplified stock conveyor design and with relatively small driving power, not only said electrodes, but also similar objects can be efficiently and correctly arranged, stocked and transported.

Another object of the present invention is to provide a transporting apparatus of such a design that comprises a first stock apparatus, a second stock apparatus, and a transfer apparatus disposed between said first and second stock apparatuses, said transfer apparatus so connecting said two stock apparatuses that as soon as the presence of an object on the first stock apparatus is detected, said transfer apparatus lifts it up and transports it to a position above the second stock apparatus, and only when the presence of a space on the second stock apparatus is detected, said transfer apparatus then transfers its load object such as an electrode to the second stock apparatus, thereby even if the first and second stock apparatus have different speeds, a smooth transporting of objects is achieved without such undesirable situations developing as one stock apparatus being fully loaded while the other stock apparatus being empty, and therefore when this transporting apparatus is utilized in transporting electrodes to be supplied to an electrolytic cell, said apparatus can be freely adapted to any automatically operating electrode supplying devices to cause a substantial reduction of the operating expenses.

The present invention will be explained more particularly with reference to the accompanying drawings.

DETAILED DESCRIPTION OF THE INVENTION

Figure 1:
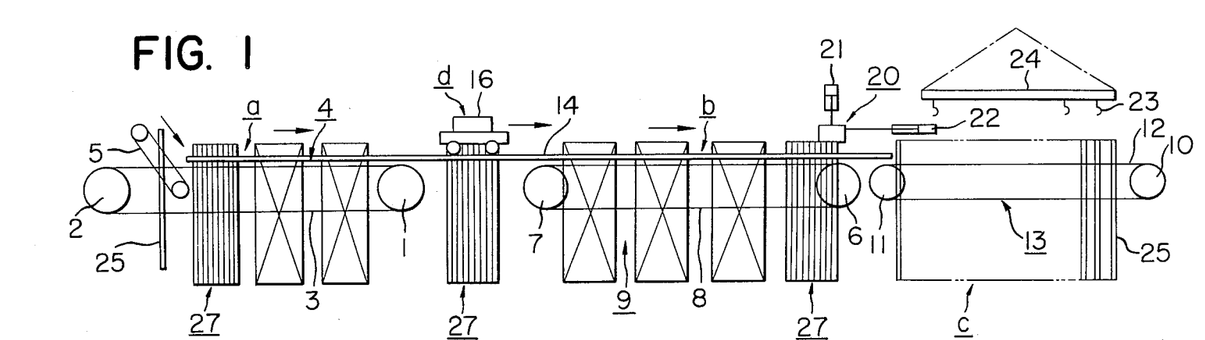
FIG. 1 is a schematic front view of an apparatus embodying the present invention.
Figure 2:
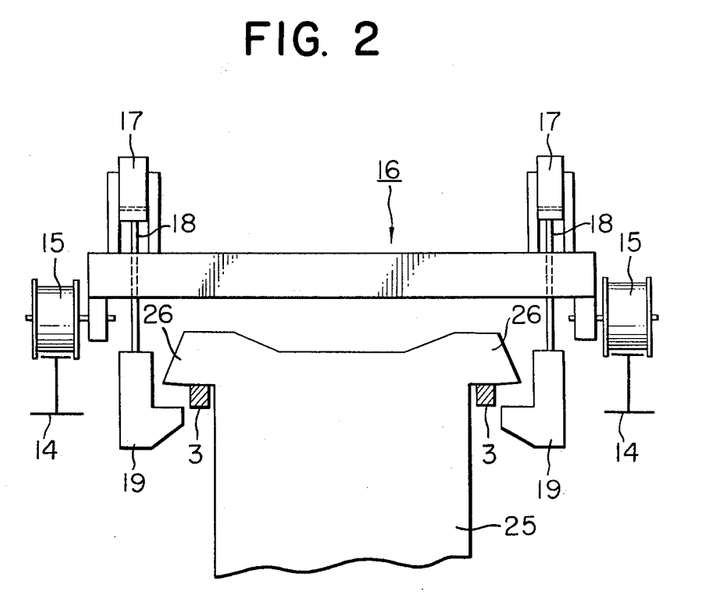
FIG. 2 is a schematic side view of a part of the apparatus shown in FIG. 1, illustrating the method of suspension of the handling object.

FIG. 1 shows an embodiment of the present invention arranged as an apparatus for inserting electrodes into electrolytic cells, which are not shown. The objects to be transported by an apparatus based on the present invention, namely electrodes 25 in this embodiment, are, as shown in FIG. 2, from 30 to 50 mm in thickness and are provided with lugs 26 outwardly extending from their two top corners.

The illustrated embodiment of the present invention includes a first stock apparatus $a$, a second stock apparatus $b$, an arranging apparatus $c$, and a transfer apparatus $d$ provided between said first and second stock apparatuses.

Figure 3:
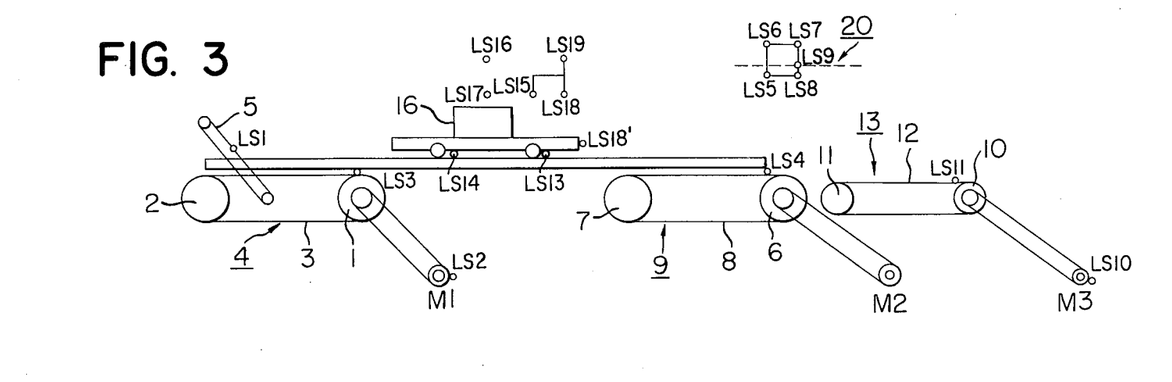
FIG. 3 is a schematic drawing showing the arrangement of the control limit switches installed on the apparatus shown in FIG. 1.

Said first stock apparatus $a$ comprises a first stock conveyor 4 incorporating two parallel endless belts 3 spanning driving wheels 1 and guide wheels with the space between the two belts nearly equal or slightly winder than the width of the electrode 25, and a conveyor 5 disposed at the inlet end, intersecting therewith at a descending inclination from a higher position, said first stock conveyor 4 being driven by a motor M1 as shown in FIG. 3, and said conveyor 5 having a plurality of hooks, not shown, arranged at a uniform space on the periphery thereof each of which hooks is adapted to suspend one each electrode.

Said second stock apparatus $b$ comprises a second stock conveyor 9 that has its inlet end at a predetermined distance from the outlet end of said first stock conveyor 4 and that is disposed on the same plane as the first stock conveyor 4, said second stock conveyor 9 being made up of two endless belts 8 that span driving wheels 6 and guide wheels 7, in the same way as the first stock conveyor 4, and being driven by a motor M2 as shown in FIG. 3.

Said arranging apparatus $c$ comprises an arranging conveyor 13 that has its inlet end at a predetermined distance from the outlet end of said second stock conveyor 9 and that is disposed on the same plane as the second stock conveyor 9, said arranging conveyor 13 being made up of two endless belts 12 that span driving wheels 10 and guide wheels 11, in the same way as the first stock conveyor 4, and being driven by a motor M3 as shown in FIG. 3.

Said endless belts 3, 8 and 12 incorporated respectively in said conveyors 4, 9 and 13 are all adapted to transport the electrodes 25 by suspending them by the two lugs 26.

There are disposed two rails 14, extending throughout said three stock conveyors 4, 9 and 13 in parallel therewith at a predetermined distance from said conveyors 4, 9 and 13, which rails 14 are spaced above and outwardly of the upper conveyor belt reaches as shown in FIG. 3.

On said rails 14, there is disposed a carriage or truck 16 reciprocating between said stock conveyors 4 and 9, running on wheels 15, said truck 16 constituting said transfer apparatus $d$, and said truck 16 being provided with two vertical power cylinders 17, one each disposed at each side of said truck 16, with their actuating rods 18 carrying at their lower ends hanging hooks 19 having their longitudinal axis horizontally extending along their travelling direction.

There is also provided a transfer apparatus 20 for transferring the electrodes 25, one at a time, from the outlet end of the second stock conveyor 9 on to the arranging conveyor 13, said transfer apparatus 20 being provided with arms, not shown, which are driven vertically by vertical power cylinders 21 and which are adapted to suspend the electrode 25, said transfer apparatus 20 being driven horizontally by means of a horizontal power cylinder 22. A similar horizontal power cylinder is provided for moving the truck 16.

There is disposed above the arranging apparatus c, a hanger 24 that is designed to be moved by a crane, not shown, and that is provided with a plurality of hanging hooks 23 at its lower portion.

FIG. 3 shows the locations of the driving systems and the limit switches that control those driving systems incorporated in the embodiment shown in FIG. 1. The locations of these limit switches will now be explained in conjunction with the movement of the electrodes 25 as follows:

The limit switch LS1 disposed approximately at the middle of the conveyor 5 within the moving range of the electrode suspended from said conveyor, is connected to a counter circuit for counting the passing electrodes and to the control circuit of the first stock conveyor driving motor M1, in such a manner that as soon as an electrode 25 trips said limit switch LS1, said counter registers it, and then, when the electrode 25 descends further and reaches the first stock conveyor 4, the motor M1 is started.

The limit switch LS2 connected to the control circuit of said motor M1 is so actuated by a limit switch actuating disc connected to the motor M1 that it is actuated to stop the motor M1 each time said disc is driven through a preset angle, thereby an intermittent motion is given to the first stock conveyor 4.

Through this intermittent motion of the conveyor 4, electrodes 25 are arrayed on the conveyor 4 in blocks 27 which are normally made up of 10 electrodes arranged at a uniform distance, a plurality of such blocks 27 being disposed, as will be described later, at a uniform spacing on the conveyor 4.

The limit switch LS3 installed on the first stock conveyor 4 at the forward end thereof, is connected to the control circuit of the motor M1 in such a manner that when it is tripped by the forwardmost electrode 25 on the first stock conveyor 4, the motor M1 is stopped.

The limit switch LS14 installed at the bottom left portion of the truck 16 is so connected to the return motion (motion from right to left) control circuit of the truck 16 that when there is no electrode or there is less than one block 27 on the first stock conveyor 4, it is tripped by a stopper, not shown, installed at the left end of the conveyor, thus providing the return end position signal for stopping the truck 16. The limit switch LS15 that is installed, together with the limit switch LS18, to be described later, on a limit switch base, not shown, that is vertically movably incorporated in the truck 16 in such a position that it is always in the tripping range of a suspended electrode in the first stock conveyor 4, is connected to the return motion control circuit of the truck 16 in such a manner that when there are one or more blocks of electrodes 25 on the first stock conveyor 4, the returning truck 16 is stopped by the detection (by switch LS15) of the extreme right electrode 25 at such a position as suitable to pick up the block 27 in which the detected electrode belongs.

The limit switches LS16 and LS17, installed on the truck 16 are connected to the control circuit of the vertical movement power cylinders 17 that drives the electrodes hanging hooks 19 in such a manner that when they are tripped during the ascending or descending movement of the hooks, the hook motion is interrupted, thereby the upper stroke end and the lower stroke end are defined for the hooks. The block 27 is engaged with and freed from the hooks 19 at an approximate middle position in this hook stroke.

The limit switch LS13 installed at the bottom right portion of the truck 16, serves to provide an interlocking function for the hook descending power cylinders 17, whereby it is installed in such a position that when the truck 16 is in a forward travelling motion, it is tripped by a stopper that is provided at such a position near the left end of the second stock conveyor 9 that there is a distance corresponding to the space of approximately one block 27 of the electrodes from the left end of the conveyor, with the result that the truck 16 advancing (from left to right) with one block 27 of electrodes suspended therefrom is not allowed to operate the switch for the power cylinder 17 unless at least said limit switch LS13 reaches the position to be tripped by said stopper or moves past it, and furthermore, even if said limit switch LS13 is tripped, the hook 19 still does not descent as long as the truck 16 is kept in motion, whereby the hook 19 is automatically lowered to transfer the block 27 of electrodes only immediately after the truck 16 is brought to a stop.

The limit switch LS18' installed at the upper right end of the truck 16 is connected to the forward motion control circuit of the truck 16 in such a manner that when there is no electrode 25 on the second stock conveyor 9, said limit switch LS18' is tripped by a stopper provided at the right end of said conveyor 9, with the result that a forward stroke end signal is produced and the truck 16 is stopped at that position. The limit switch LS18 installed on the limit switch base is connected to the forward motion control circuit of the truck 16 in such a manner that when there is at least one electrode 25 on the second stock conveyor 9, it is tripped by the leftmost electrode 25 on said conveyor to stop the truck 16, before the limit switch LS18' is tripped by its stopper, with the result that the hooks 19 are allowed to descend and transfer the block 27 of electrodes in the position next to said electrode 25 on the conveyor 9. When the second stock conveyor 9 is fully loaded with electrodes or when there is only a space of size less than one block of electrodes, the advancing truck 16 is stopped as soon as the limit switch LS18 detects the leftmost electrode on the conveyor, but because at this time, the limit switch LS13 is still short of its stopper so that the control circuit of the hooks 19 descending power cylinders is still kept open, even when the truck 16 is stopped, the hooks 19 do not descend. The truck 16 is thereafter allowed to move forward stepwise in phase with the reduction of the electrodes 25 on the conveyor 9, until at last it moves so far to the right that the limit switch LS13 is tripped by its stopper, whereupon the truck 16 stops and simultaneously the hooks 19 descend to transfer the block 27 of electrodes on to the conveyor 9.

The limit switch LS19 is installed on the truck 16 in the moving range of the limit switch base and is connected to the lift motion control circuit of the limit switch base in such a manner so as to provide the upper stroke limit for said base during its upward movement, which is initiated simultaneously with the initiation of a backward motion of the truck 16, which in turn is initiated by the closing of the limit switch LS17 which takes place when the truck 16, appropriately positioned over the stock conveyor 9, lowers the hooks 19 first to transfer a block 27 of electrodes onto the stock conveyor 9, and further lowers finally to actuate the limit switch LS17. Said limit switch base automatically descends after a preset time. The reason for this lifting of the limit switch base is that if it is left in its lower position when the truck 16 returns, the limit switch LS15 installed on it is tripped by the block 27 that has been just transferred on the second stock conveyor 9 with the result that the truck 16 is stopped. It is necessary that at least during the time the truck 16 moves over this block 27, the limit switch base be lifted clear of the block, and then lowered again so as to detect electrodes 25 on the first stock conveyor 4.

The limit switches LS4 (A, B) installed one each on each side of the belts 8 at the right end of the second stock conveyor 9 are connected to the control circuit of the driving motor M2 of that conveyor in such a manner that only when both the limit switches LS4 (A, B) are tripped by an electrode, the motor M2 stops, and the motor keeping on running when only one of the limit switches LS4 is tripped, with the result that any skew hanging position of an electrode on the belts 8 is thereby corrected.

The limit switches LS5, LS6, LS7, LS8 and LS9 all installed on the transfer apparatus 20 are all related to the control circuit of the transfer arm of that transfer apparatus 20 and operates as follows: When said arm trips the limit switch LS5 while the limit switches LS4 (A, B) are being tripped by an electrode 25, immediately, this arm is set in a lifting motion; on its way said arm takes picks up said electrode and lifts it up further until said arm trips the limit switch LS6 at its upper stroke end; thereupon, said arm starts to move forward (moves from left towards right) keeping its height, and moves on until it trips the limit switch LS7 when it reaches a position above the arranging conveyor 13 of the arranging apparatus c. Because said limit switch LS7 is related not only to the arm control circuit but also to the control circuit of the conveyor 9 driving motor M2, when said arm trips said switch LS7, not only the arm starts to descend immediately, but also the motor M2 is started to drive the second stock conveyor 9, with the result that a next electrode 25 is carried forward until it trips the two limit switches LS4 (A, B) and is stopped by them. On the other hand, said arm keeps on its descending motion, transferring the electrode onto the arranging conveyor 13 on its way, until it trips the limit switch LS8 at its lower stroke end; because this limit switch LS8 is related not only to the arm control circuit but also to the control circuit of the arranging conveyor 13 driving motor M3, when it is tripped, not only said arm starts to move backward (motion from right towards left), but also the motor M3 is started to drive the arranging conveyor 13, thereby sending the electrodes 25 which are found on the arranging conveyor 13 forward. When the returning arm reaches its left stroke end, it trips the limit switch LS5 which in turn initiates the upward motion of said arm; because by this time, an electrode has been sent to the position of the limit switches LS4 (A, B) and the second stock conveyor 9 is at a standstill, the rising arm lifts this electrode on its way and thus the series of motions just described is started again. The limit switch LS10 installed on a disc that is connected to the motor M3 is connected to the control circuit of the motor M3 in such a way that each time the disc is rotated through a predetermined angle, the motor is stopped, thereby the arranging conveyor 13 is driven in an intermittent motion, with the result that the electrodes 25 transferred from the transfer apparatus 20 by the transfer arm one by one are arranged at approximately uniformly spaced intervals on the arranging conveyor. The limit switch LS11 installed at the right end of said arranging conveyor 13 is related to the control circuit of the motor M3 in such a way that when an electrode 25 reaches the right end position, tripping the limit switch LS11, the motor M3 is stopped and the arm of the transfer apparatus 20 is stopped upon tripping the limit switch LS7. The limit switch LS9 installed between the limit switches LS7 and LS8 may be connected to the control circuit of the arranging conveyor 13 driving motor M3 in such a way in replacement of the limit switch LS8, that it starts the conveyor driving motion of the motor M3 as soon as the arm of the transfer apparatus 20 transfers an electrode 25 onto the arranging conveyor 13, thereby somewhat reducing the time required to start the transfer conveyor from the previously described method wherein the limit switch LS8 is connected to the control circuit of the motor M3. In this way, when the arranging conveyor 13 is fully loaded with electrodes 25 or a sufficient number of electrodes are arranged on it to be lifted by the hanger 24, the whole electrodes are lifted by the hooks on the hanger 24, for the purpose of bringing it to and inserting in an electrolytic cell or in other devices.

Figure 6:
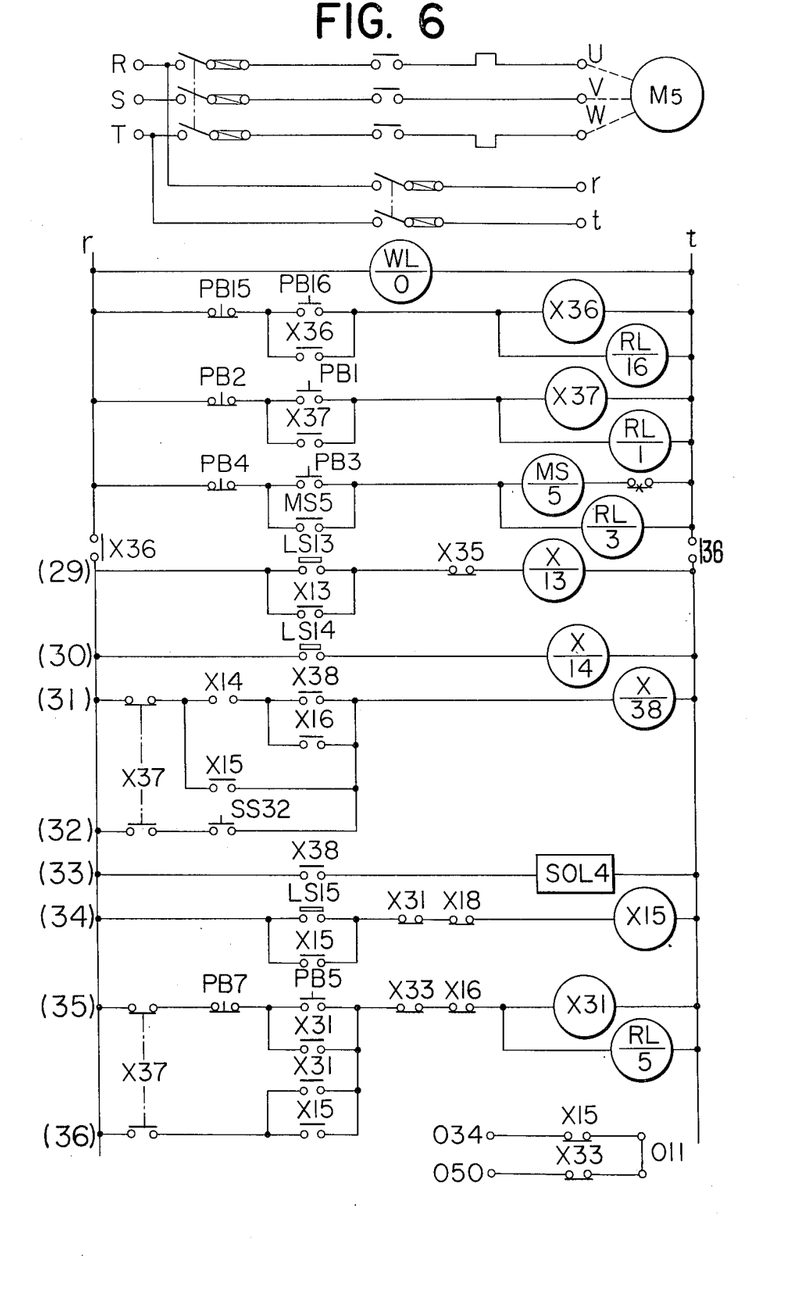
Figure 7:
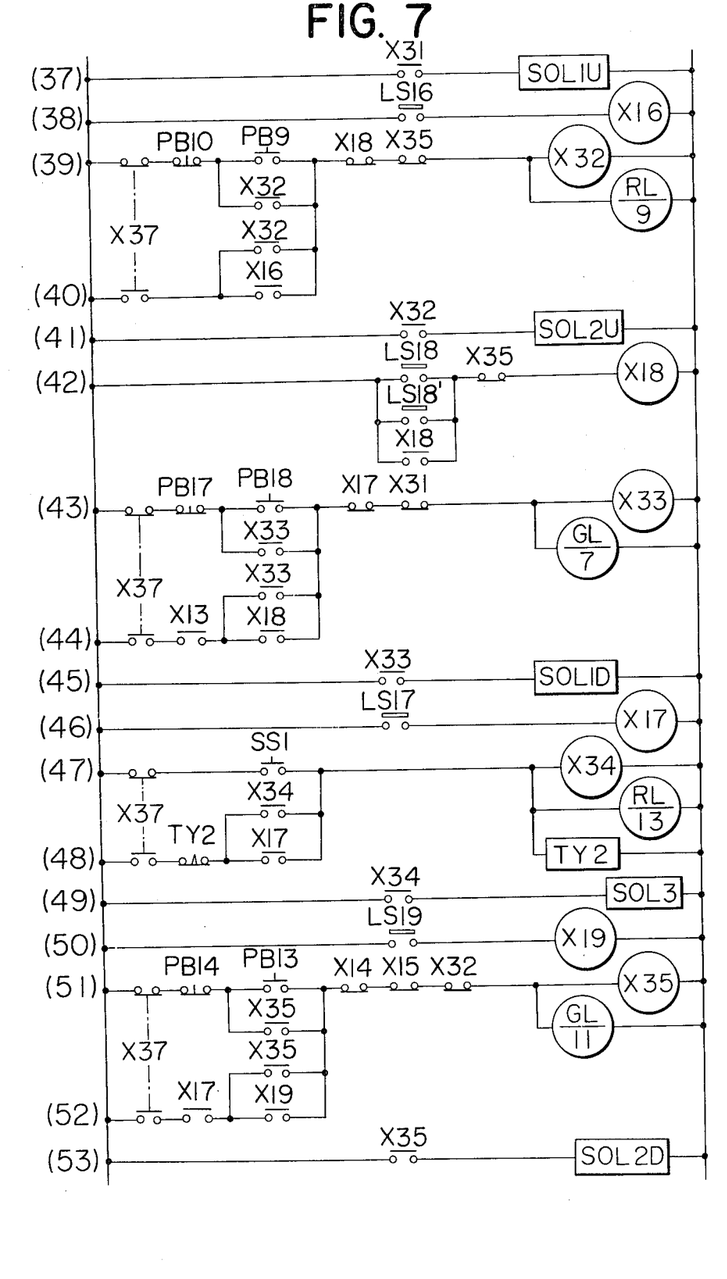
Figure 8:
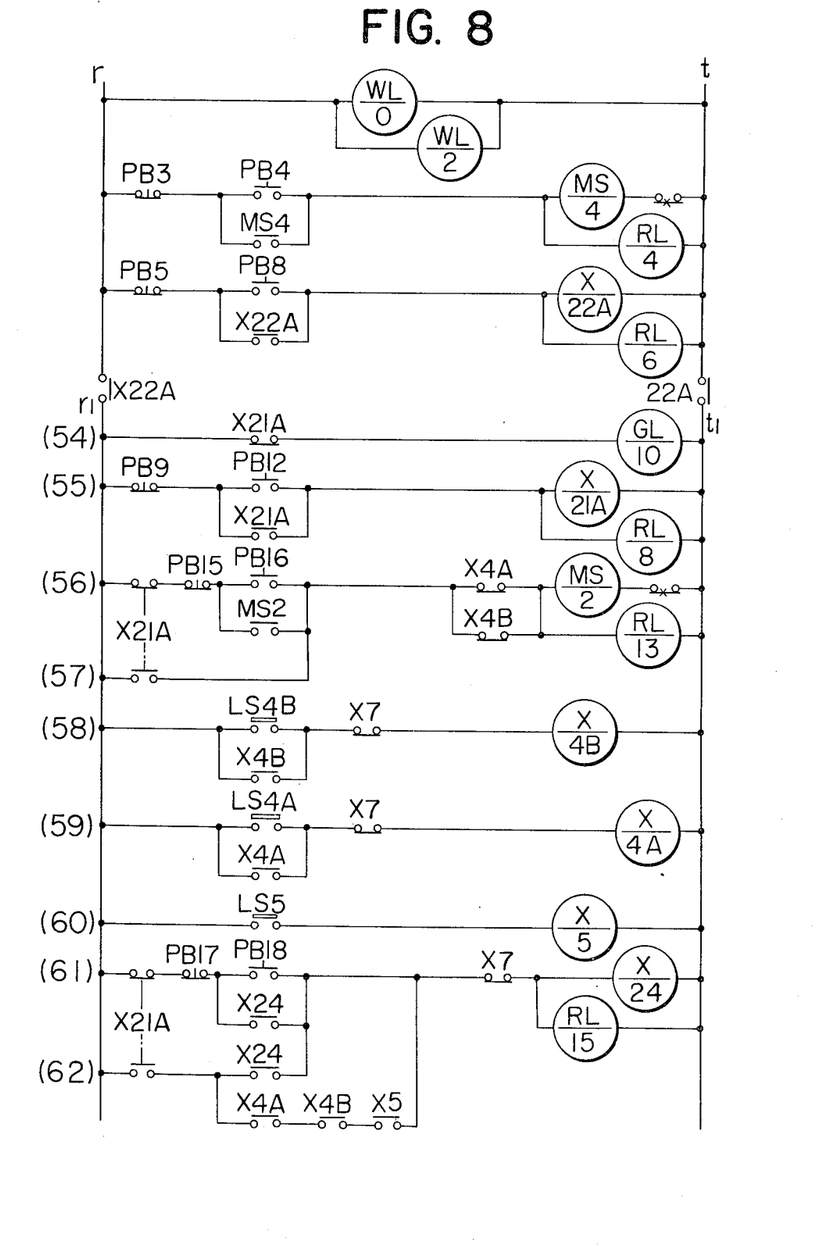
Figure 9:
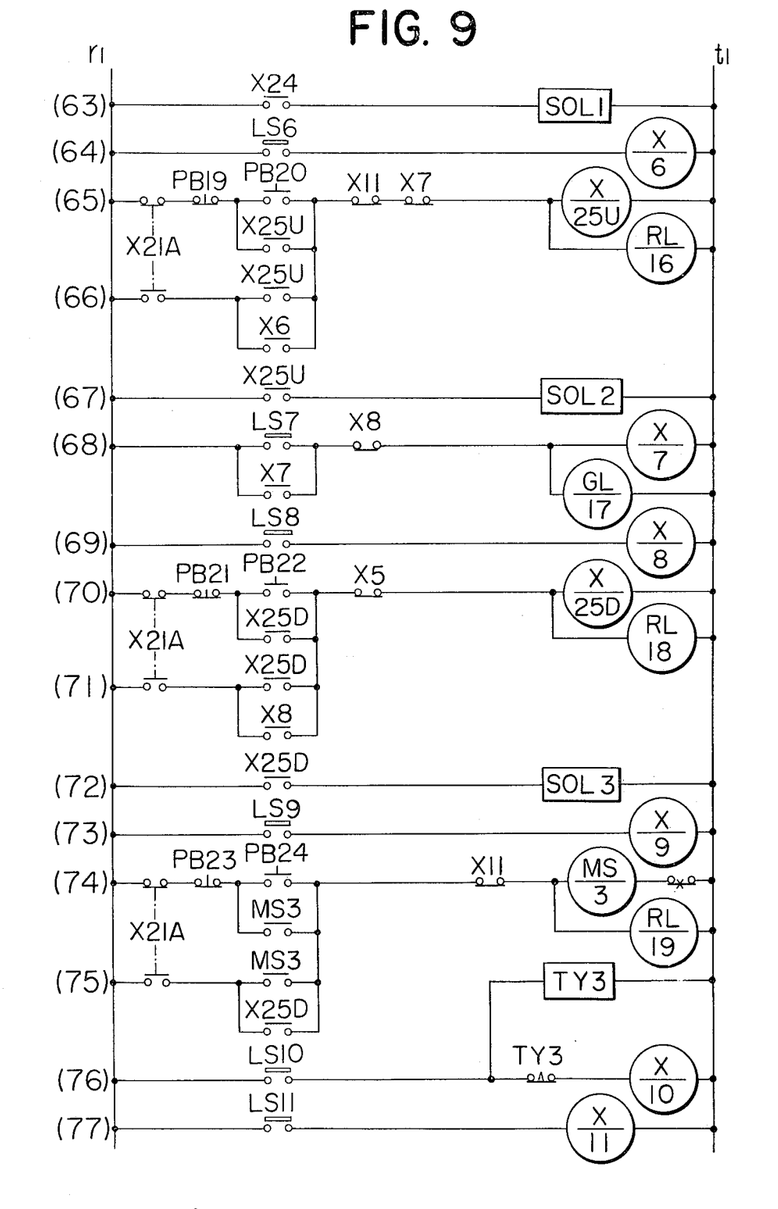

Now those motions of the embodiment shown in FIG. 1 will be described in reference to the circuit diagrams shown in FIGS. 5 through 10, wherein each line is identified by one of the numbers 20 through 77 attached at one end thereof, relays related to contacts X0, X2 . . . and MS1, MS2 . . . are represented by X/0, X/2 . . . and MS/1, MS/2, time delay contacts and their related timer relays are represented by TY1, TY2 . . . , and push buttons are control circuit diagrams mainly related to the first stock apparatus a, FIGS. 6 and 7 are control circuit diagrams mainly related to the transfer apparatus d, and FIGS. 8 and 9 are control circuit diagrams mainly related to the second stock apparatus b and the arranging apparatus c.

1. Arrangement of electrodes or other objects on the first stock apparatus a

Figure 4:
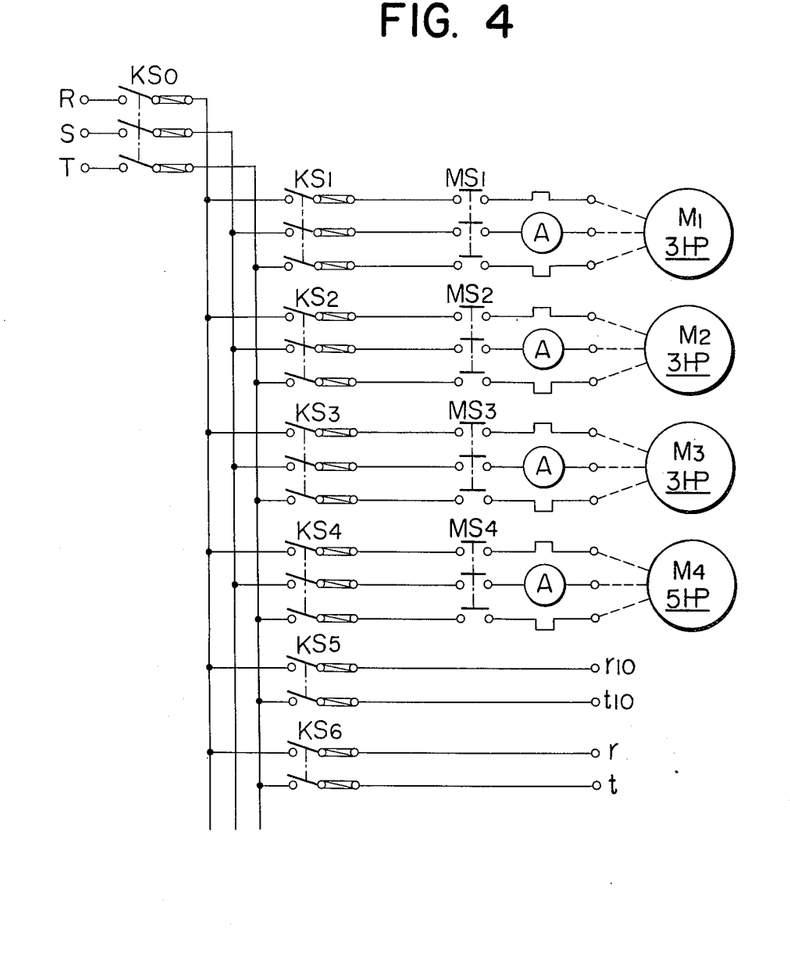
FIGS. 4 through 9 are electric control circuit diagrams showing the control circuit of the apparatus shown in FIG. 1.
Figure 5:
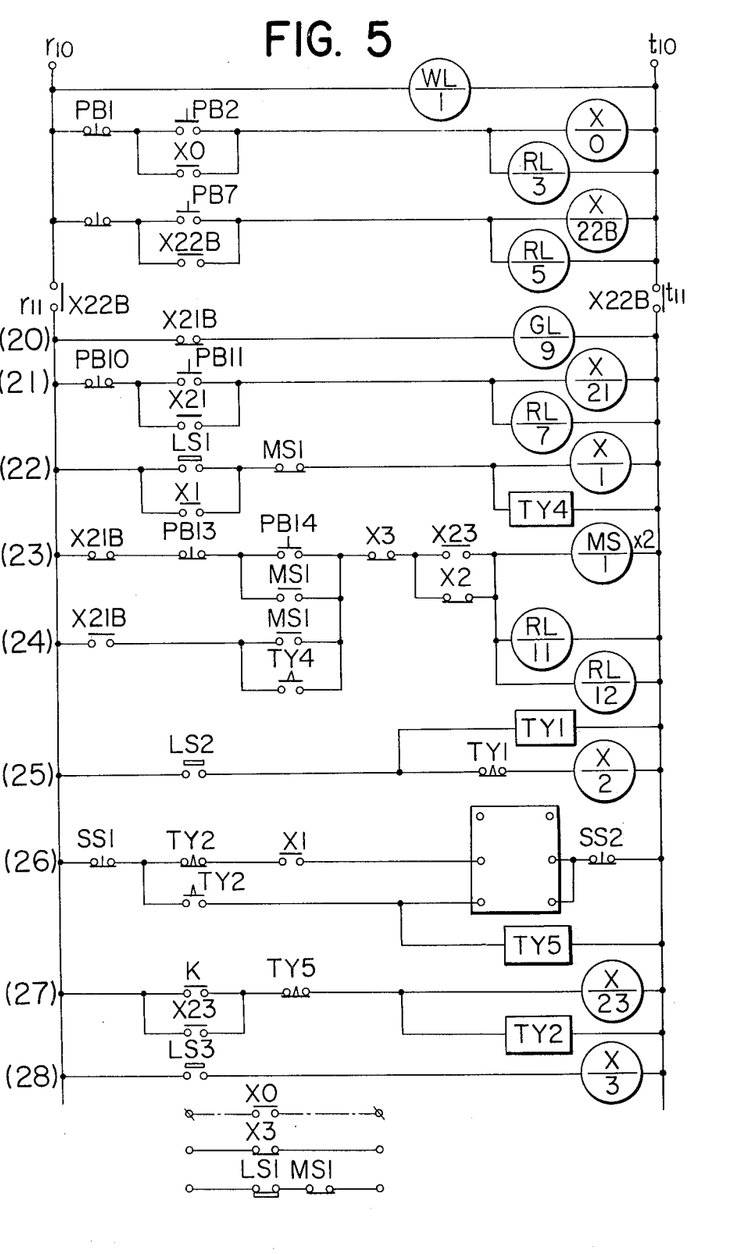

As cast electrodes 25 are delivered to the conveyor 5, they are hung on the hooks provided thereon, one by one, and are sent down at a uniform space towards the first stock conveyor 4 located beneath it. In their way down, when they trip the limit switch LS1, the relay X/1 in the line 22 (object detection line) closes contact X1 in the line 26 (counter line) thereby counting the number of electrodes that passed the limit switch LS1, and at the same time, energizes the timer TY4 in the line 22. The timer TY4 is so adjusted that after an electrode 25 descending on the conveyor 5 trips the limit switch LS1, just coinciding with the transfer time of the electrode onto the first stock conveyor 4, said timer TY4 is actuated to close the time delay contact TY4 in the line 24 (control line for the first stock conveyor 4), thereby starting the motor M1 through the relay MS/1 and thus starting the first stock conveyor 4. Then, when the first stock conveyor carries the received electrode through 20 to 50 mm, the limit switch LS2 is tripped thereby closing the contact X2 on the line 24 by the actuation of the relay X/2, and consequentially deenergizing the relay MS/1 to stop the motor M1. By repeating these motions, on the first stock conveyor 4, the number of electrode suspended at a regular interval is steadily increased until there are 10 electrodes that form one block 27. When the last electrode 25 forming one block trips the limit switch LS1, in addition to the abovementioned functions, the contact K on the line 27 (block detection line) is closed by a command from the counter line 26, with the result that because the contact X23 on the line 24 is closed by the relay X/23, the first stock conveyor driving motor is kept in an operable state even when the contact X2 on the same line is opened by the actuation of the limit switch LS2. On the other hand, by the actuation of the timer TY2 on the line 27, the time-delay contact TY2 is switched over with the result that current is sent through the time delay contact TY5 — the motor M1 is driven — the first stock conveyor 4 is driven, — then one block 27 is sent through approx. 200 mm. At this time, through the actuation of the timer TY5, the time delay contact TY5 on the line 27 is opened — relay X/23 is deenergized — contact X23 on the line 23 opens — then, motor M1 is stopped. In this way, when the first electrode 25 of the next block arrives at the first stock conveyor 4, there is approx. 200 mm space after the last electrode 25 of the last block 27, and there will be always a uniform interval between all subsequent blocks 27. By repeating these motions, finally, several blocks of electrodes, each block 27 consisting of a uniform number of electrodes, will be arrayed at a uniform interval on the first stock conveyor 4. The blocks of electrodes arrayed on the first stock conveyor 4 are transported in this way towards the right until the foremost electrode 25 of the foremost block 27 trips the limit switch LS3, whereupon the relay X/3 in the line 28 (full load detection line for the first conveyor 4) is actuated to open the contact X3 on the line 23, and thereby to stop the motor M1. The conveyor 5 is stopped similarly thereby.

2. Conveying electrodes through transfer apparatus *d* i. Transfer of blocks 27 from the first stock conveyor to the truck 16

The truck 16 is provided with two hanging hooks 19 which are actuated by the hydraulic cylinders 17, and which are always positioned underneath the lugs 26 of the electrodes 25, as shown in FIG. 2, in such a way that whenever the hooks 19 are lifted, the block 27 of electrodes can be immediately lifted. If there is no electrode 25 or there are only electrodes less than one block, when the truck 16 moves towards the left end of its stroke, the limit switch LS14 is tripped by said stopper installed at the left end thereby opening the contact X14 on the line 51 (return control line for truck) by the action of the relay X/14 on the line 30 (truck return limit detection line), thereby deenergizing the relay X/35 to open the contact X35 on the line 52, with the result that the truck 16 is stopped and kept in the stopped condition until one block 27 of electrodes will be accumulated. When sufficient number of electrodes to form one block 27 is mounted on the first stock conveyor 4 and the foremost electrode 25 comes in contact with the limit switch LS15, the contact X15 on the line 36 (hook lifting control line) is closed by the relay X/15 on the line 34 (object detection line), thereby the contact X31 on the line 37 is closed by the relay X/31, with the result that the hydraulic valve SOL1U is actuated to drive the cylinders 17, to lift the hooks 19, suspending the complete block 27. When the hooks trip the limit switch LS16 at the upper stroke end of the hooks, the contact X16 on the line 36 is opened by the relay X/16 on the line 38 to stop the hook lifting motion, and simultaneously the contact X16 on the line 40 is closed so that the hydraulic valve SOL2U is energized with the result that hydraulic fluid is supplied to a horizontal power cylinder so that the truck 16 is driven forward with one block 27 of electrodes suspended therefrom.

If one or more blocks of electrodes are arrayed on the first stock conveyor 4 when the truck 16 moves from right to left, the limit switch LS15 is tripped by the forwardmost electrode of the forwardmost block 27, before the limit switch LS14 is tripped by the stopper, with the result that the contact X15 on the line 51 is opened by the relay X/15 on the line 34, to stop the return motion of the truck 16 and the contact X15 on the line 36 is closed to lift the hooks 19, thereby lifting the block 27 of electrodes and sending the truck forward in the same sequence as in the previously described case.

ii. Transferring the block 27 from the truck 16 on to the second stock conveyor 9

When the truck 16 moves forward towards the second stock conveyor 9, if there is no electrode 25 on the second stock conveyor, first, the limit switch LS13 is tripped by a dog disposed on the second stock conveyor 9 at a distance approximately corresponding to the space of the suspended block 27, from the left end of conveyor 9, thereby the interlock is released by the closing of the contact X13 on the line 44 (hook descend control line) by the relay X/13 on the line 29 (hook descend interlocking line), and then, the truck 16 moves on further forward until the limit switch LS18' is tripped by the stopper provided at the right end of the second stock conveyor 9. The tripping of the limit switch LS18' then results in the actuation of the relay X/18 on the line 42 (truck forward limit position detection line) — opening the contact X18 on the line 40 — deenergizing the relay X/32 — opening the contact 32 on the line 41 — deenergizing the hydraulic valve SOL2U — stopping the truck 16, and simultaneously, closing the contact X18 on the line 44 — closing the contact X33 on the line 45 by the relay X/33 — energizing the hydraulic valve SOL1D — lowering the hooks 19. In descending, the hooks transfer the block 27 onto the second stock conveyor 9, but goes on descending until it trips the limit switch LS17 at the lower end of its stroke, whereupon opening the contact X17 on the line 44 by the relay X/17 on the line 46 — opening the contact X33 on the line 45 by deenergizing the relay X/33 — deenergizing the hydraulic valve SOL1D — stopping the descending motion of the hooks 19, at the same time, closing the contact X17 on the line 48 (limit switch base lift cylinder driving line) — closing the contact X34 on the line 49 by the relay X/34 — energizing the hydraulic valve SOL3 — lifting the limit switch base. The limit switch base trips the limit switch LS19 at its upper stroke end thereby closing the contact X19 on the line 52 by the relay X/19 on the line 50 (limit switch base upper limit detection line) — closing the switch X35 on the line 53 by the relay X/35 — energizing the hydraulic valve SOL2D — driving the truck 16 backward, on the other hand, the timer TY2 on the line 48 opens the time delay contact TY2 after a preset time — deenergizing the relay X/34 — opening the contact X34 on the line 49 — deenergizing the hydraulic valve SOL3 — the limit switch base descends to the original position.

If there are one or more electrodes on the second stock conveyor 9 the advancing truck 16 first has the limit switch LS13 tripped by the stopper on the second stock conveyor 9, thereby releasing the interlock on the descending motion of the hooks 19, as before, then the truck 16 moves on further so that the limit switch LS18 is tripped by the leftmost electrode 25 on said stock conveyor 9, before the limit switch 18' is tripped by the stopper at the right end of said conveyor. Thereupon the truck 16 is stopped by the actuation of the relay X/18 on the line 42, and at the same time, the hooks 19 are lowered, thereby the block 27 is transferred onto the second stock conveyor 9 and the truck starts to return as in the previous case.

If the second stock conveyor 9 is fully loaded with electrodes or if there is only a space smaller than one block space, the limit switch LS18 on the advancing truck 16 is tripped by the leftmost electrode on the second stock conveyor 9, before the limit switch LS13 is tripped by the stopper, thereby the truck 16 is stopped because the contact X18 on the line 39 is opened by the relay X/18. However, in this case, although the contact X18 on the line 44 is closed by said relay X/18, because the limit switch LS13 is still open and therefore the relay X/13 on the line 29 is not energized, the contact X13 on the line 44 is kept open, with the consequence that even when the truck 16 is stopped, the hooks 19 remain at their upper positions. Thus, the truck 16 is left in that position motionless, only to be driven forward as the electrodes on the second stock conveyor 9 are reduced. Only when the truck 16 moves so far forward, advancing stepwise, as to have its limit switch LS13 tripped by the dog, then, the contact X13 on the line 44 is closed, this closing signifying the presence of a sufficient space for one block of electrodes on the stock conveyor, thereby the hooks descend first to transfer the block on the conveyor and then to retreat.

3. Movement of electrodes or other objects on the second stock apparatus *b* and on the arranging apparatus *c*

When the block 27 transferred onto the second stock conveyor that constitutes the principal member of the second stock apparatus *b* from the truck 16 arrives at the right end of said conveyor, through the intermittent driving motion thereof, the block trips both the limit switches LS4 (A, B), thereby actuating the relays X/4B and X/4A on the lines 58 and 59 respectively to open the contacts X4A and X4B on the line 57 (control line of the second stock conveyor 9), with the result that the relay MS/2 is actuated to stop the motor M2 and consequently to stop the second stock conveyor 9. However, because at this time, in the electrode suspension region underneath the position of said limit switches LS4 (A, B), the arm (not shown) of the transfer apparatus 20 is stationed in readyness, keeping the limit switch LS5 in a tripped condition, thereby keeping the contact X5 on the line 62 (arm lift cylinder control line) of the relay X/5 on the line 60 in the closed condition, when said relays X/4A and X/4B close their contacts X4A and X4B on the line 62, thereby the relay X/24 closes its contact X24 on the line 63, the hydraulic valve SOL1 is energized to lift the arm of the apparatus 20, which arm picks up one electrode 25 on its way. At the upper stroke end, the arm trips the limit switch LS6, thereby actuating the relay X/6 on the line 64 which closes its contact X6 on the line 66 (arm advance cylinder control line), thereby the relay X/25U energizes the hydraulic valve SOL2, which drives the arm towards the right without letting it to descend until the electrode 25 is carried to the right stroke end of the arm above the arranging conveyor 13. At this position, the electrode trips the limit switch LS7, which then actuates the relay X/7 on the line 68 to open the contact X7 on the line 65, with the result that the arm stops its advance motion, and simultaneously, because the contact X7 on the line 61 is opened, the hydraulic valve SOL1 is deenergized so that the arm transfer is lowered automatically. At the same time, because the contacts X7 on the line 58 and on the line 59 are also opened when the relay X/7 is energized, relays X/4A and X/4B are deenergized, thereby the contacts X4A and X4B on the line 57 are closed, the motor M2 is again driven through the relay MS/2, thereby the next electrode is sent up to where it trips the limit switches LS4 (A, B), stopping the second stock conveyor 9 as before. In the meantime, the descending arm transfers the electrode it carried onto the arranging conveyor 13 on its way down, and then, descending further, trips the limit switch LS8 at the lowest point of its stroke, thereby closing the contact X8 on the line 71 (arm retreat cylinder control line) by its relay X/8 on the line 69, and consequently closing the contact X25D on the line 72 by its relay X/25D to energize the hydraulic valve SOL3, which makes the transfer arm move back from right towards left. Simultaneously, the contact X25D on the line 75 (control line of the arranging conveyor) of said relay X/25D is closed, thereby the relay MS/3 drives the motor M3, which in turn drive the arranging conveyor 9 forward, consequently sending the electrode 25 transferred from the arm forward. On the other hand, the retreating arm trips the limit switch LS5 again at its left stroke end, thereby closing the contact X5 on the line 62 by its relay X/5 on the line 60, and consequently lifting the arm immediately, which in its way upward, picks up an electrode 25 as before, thus initiating another transfer cycle of the electrode onto the arranging conveyor 13. In the meantime, when the motor M3 drives the arranging conveyor through a predetermined distance, a disc mounted on the shaft of the motor M3 trips the limit switch LS10, which actuates the relay X/10 on the line 76 to open its contact X10 on the line 74, which deenergizes the relay MS/3 to stop the motor M3, with the result that there is a predetermined space made before the electrode that comes onto the arranging conveyor next. In this way, all the electrodes on the arranging conveyor 13 are arranged at a uniform spacing, and are conveyed forward, until the foremost electrode trips the limit switch LS11, whereupon the relay X/11 on the line 77 (electrode full load detection line) is energized to open the contact X11 on the line 65, with the result that the arm forward driving cylinder is kept motionless even when the arm, rising with a next electrode, trips the limit switch LS6 to close the contact X6 on the line 66. If there is no electrode on the second stock conveyor 9, because the contact X5 is connected in series with the contact X4A and X4B on the arm lift conveyor between the power source, unless the contact X4A and X4B are closed by an electrode, even when the contact X5 is closed, the arm is prevented from rising and is kept in its lower position in readyness for a next motion. It should be noted furthermore, that while in the foregoing description, the contact 25D in the line 75 (control line for the arranging conveyor 13) is assumed to be closed as a consequence of the tripping of the limit switch LS8, if the limit switch LS9 is re-arranged so as to be tripped by the arm just when it has transferred an electrode onto the arranging conveyor 13 on its descending stroke carrying that electrode, and further if the contact X25D on the line 75 is replaced by a contact X9 so that this contact on the line 75 is closable by the actuation of the relay X/9 on the line 73, the arranging conveyor 13 is set in motion already before the limit switch LS8 is tripped, thereby some advantage is gained from the accelerated function of the arranging conveyor 13. When the arranging conveyor 13 becomes fully loaded, the whole electrodes on it are lifted by the hanger 24 disposed thereabove, with the result that the limit switch LS11 is opened, thereby deenergizing the relay X/11 to close the contact X11 on the line 65 which enables the advance motion of the transfer apparatus and consequently enables the same cycle of operations as before. While a few embodiment of the invention have been illustrated and described in detail above, it is particularly understood that the invention is not limited thereto or thereby.

What is claimed is:

1. In a method of transporting articles, particularly electrode plates, comprising the steps of:

providing a first conveyor having a first endless conveyor belt adapted to have said articles deposited thereon and transported thereby, said first belt having a substantially horizontally extending upper reach with a loading station and a discharge station associated therewith for respectively permitting articles to be deposited on and removed from the first belt;

sequentially depositing said articles one-by-one on said first conveyor belt at said loading station;

intermittently moving said first belt and the articles deposited thereon in timed relationship with the depositing of articles on said first belt so that the articles as deposited on said first belt are located in succession one after the other with a predetermined uniform distance between each pair of adjacent articles, the intermittent moving of said first belt causing said articles to be advanced toward said discharge station;

providing a second conveyor having a second endless conveyor belt associated therewith and adapted to have groups of said articles deposited thereon and transported therealong, each said group containing a preselected number of adjacent and aligned articles, said second belt having a substantially horizontally extending upper reach with supply and removal stations associated therewith for respectively permitting the articles to be deposited on and removed from said second belt;

providing transfer means disposed above and movable back and forth between said first and second conveyors for transferring articles from said first belt to said second belt;

moving said transfer means in a rearward direction from said second belt toward said first belt and then stopping said transfer means (1) upon sensing the frontmost article of a group as supported on said first conveyor belt, or (2) upon reaching a predetermined position relative to said first conveyor belt without having sensed the presence of a said group;

after stoppage of said transfer means, transferring said group from said first conveyor to said transfer means by lifting said group upwardly through a preselected distance so that said group is removed from said first belt and is supported on said transfer means;

moving said transfer means containing thereon said group of articles in a forward direction toward said second conveyor until said group is positioned over and spaced upwardly from the upper reach of said second belt;

maintaining said group on said transfer means while continuing the forward movement of said transfer means until said transfer means senses the presence of a preselected space on said second belt of a size capable of permitting said group to be deposited on said second belt;

continuing the forward movement of said transfer means, while maintaining said group of articles supported thereon, and then stopping the forward movement of said transfer means (1) upon sensing the rearmost group of articles on said second belt or (2) upon reaching a preselected position relative to said second conveyor;

after stoppage of said transfer means, then transferring said group from said transfer means to said second belt by moving said group downwardly until it is deposited and supported on said second belt; and then moving said transfer means rearwardly toward said first conveyor upon detecting the completion of the transfer of said group to said second belt to permit the initiation of a further cycle of operation.

2. A method according to claim 1, including the additional step of:

moving said first belt forwardly through a greater distance after said preselected number of articles have been positioned on said first belt before permitting a further article to be deposited on said first belt, whereby the articles as deposited on said first belt are collected in said groups with said groups being spaced apart by a preselected uniform distance which is greater than the spacing between the adjacent articles within said group.

3. A method according to claim 2, including the additional step of:

stopping said transfer means containing thereon said group when said transfer means is being moved in said forward direction and said transfer means senses the rearmost group of articles on said second belt prior to sensing the presence of said preselected space, and then continuing the forward movement of said transfer means as the rearmost group of articles on said second belt advances until said transfer means senses the presence of said preselected space.

4. A method according to claim 1, including the additional steps of:

providing a third conveyor having a third endless conveyor belt adapted to have said articles deposited thereon and transported therealong, said third belt having a substantially horizontally extending upper reach;

providing second transfer means disposed above and movable back and forth between said second and third conveyors for transferring articles from said second belt to said third belt;

moving said second transfer means in a rearward direction from said third belt toward said second belt;

stopping the rearward movement of said second transfer means when positioned over the discharge end of said second belt;

transferring a single one of said articles from said second belt to said second transfer means by lifting said single article upwardly a preselected distance so that said article is removed from said second belt and is supported on said second transfer means;

moving said second transfer means containing said single article thereon in a forward direction toward said third conveyor until said article is positioned over and spaced upwardly from the upper reach of said third belt, and then stopping the forward motion of said second transfer means;

transferring said single article from said second transfer means to said third belt by moving said article downwardly until it is deposited and supported on said third belt; and then moving said second transfer means rearwardly toward said second conveyor to permit a further article to be removed from said second belt.

5. A method according to claim 4, including the additional steps of:

intermittently moving said second belt through a preselected distance during each cycle of the second transfer means to thereby advance the endmost article on the second belt into a discharge position wherein it can be transferred to said second transfer means; and intermittently moving said third belt and the articles deposited thereon in timed relationship with the depositing of articles on said third belt so that the articles as deposited on said third belt are located in succession one after the other with a predetermined uniform distance between each pair of adjacent articles.

* * * * *